United States Patent [19]
Robertson

[11] Patent Number: 5,927,272
[45] Date of Patent: Jul. 27, 1999

[54] COMBINATION SOLAR POWERED CIGARETTE LIGHTER AND TELESCOPE

[76] Inventor: Dana R. Robertson, 1821 W. Page Ave., Fullerton, Calif. 92833

[21] Appl. No.: 09/115,871

[22] Filed: Jul. 15, 1998

[51] Int. Cl.⁶ ............................................. F24J 2/08
[52] U.S. Cl. ............................................. 126/699; 126/700
[58] Field of Search ............................. 126/698–700, 126/683

*Primary Examiner*—Carroll B. Dority
*Attorney, Agent, or Firm*—Stephen Donovan

[57] ABSTRACT

A solar powered cigarette lighter comprising a hollow tube fitted at one end with a light gathering lens and near the other end of the tube with a rod, the tip of which rod holds a light reflective substance positioned at the focal point of the lens to indicate where the end of a cigarette inserted transversely through a port the side of the tube should be positioned so as to ignite the cigarette.

21 Claims, 9 Drawing Sheets

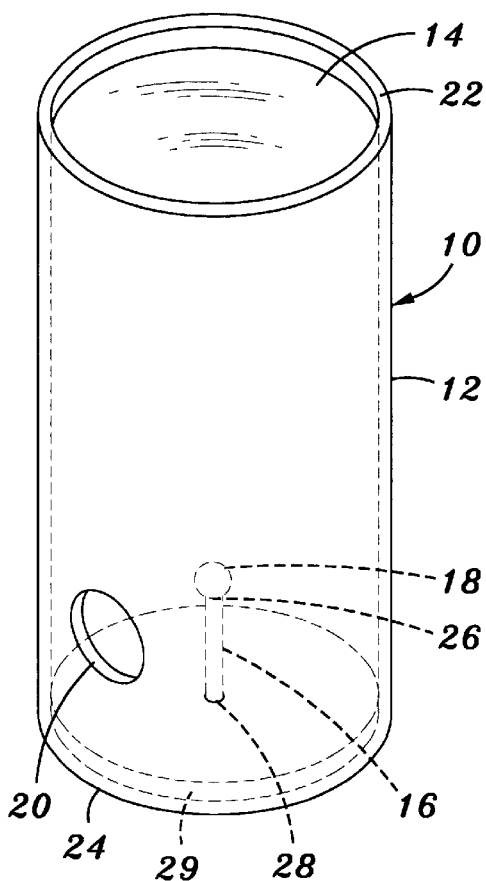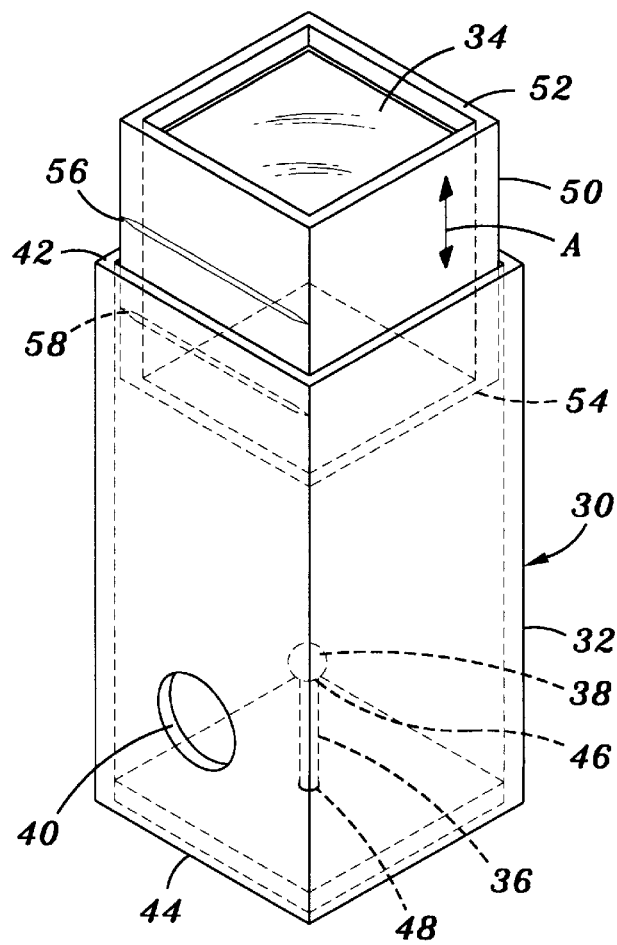

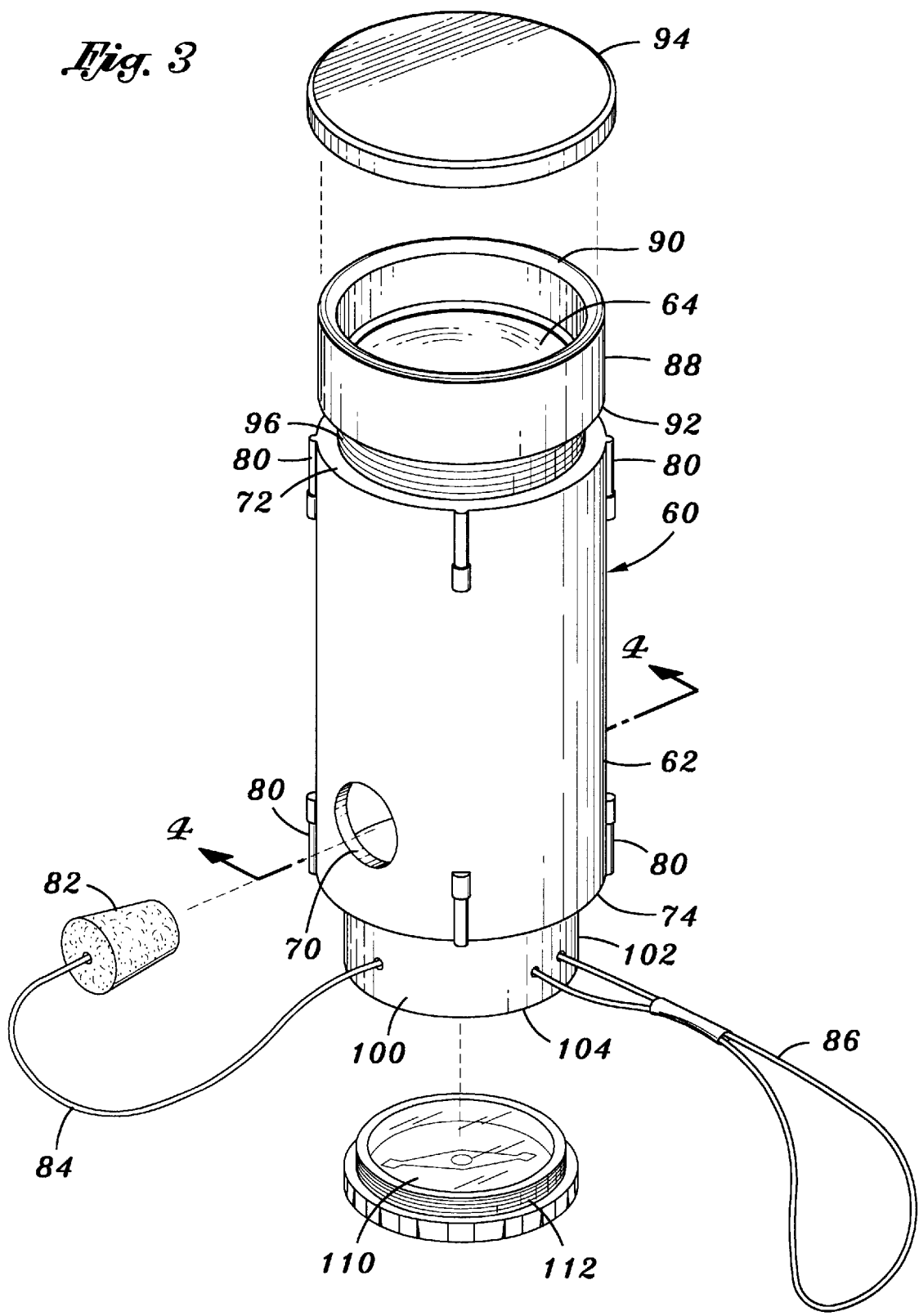

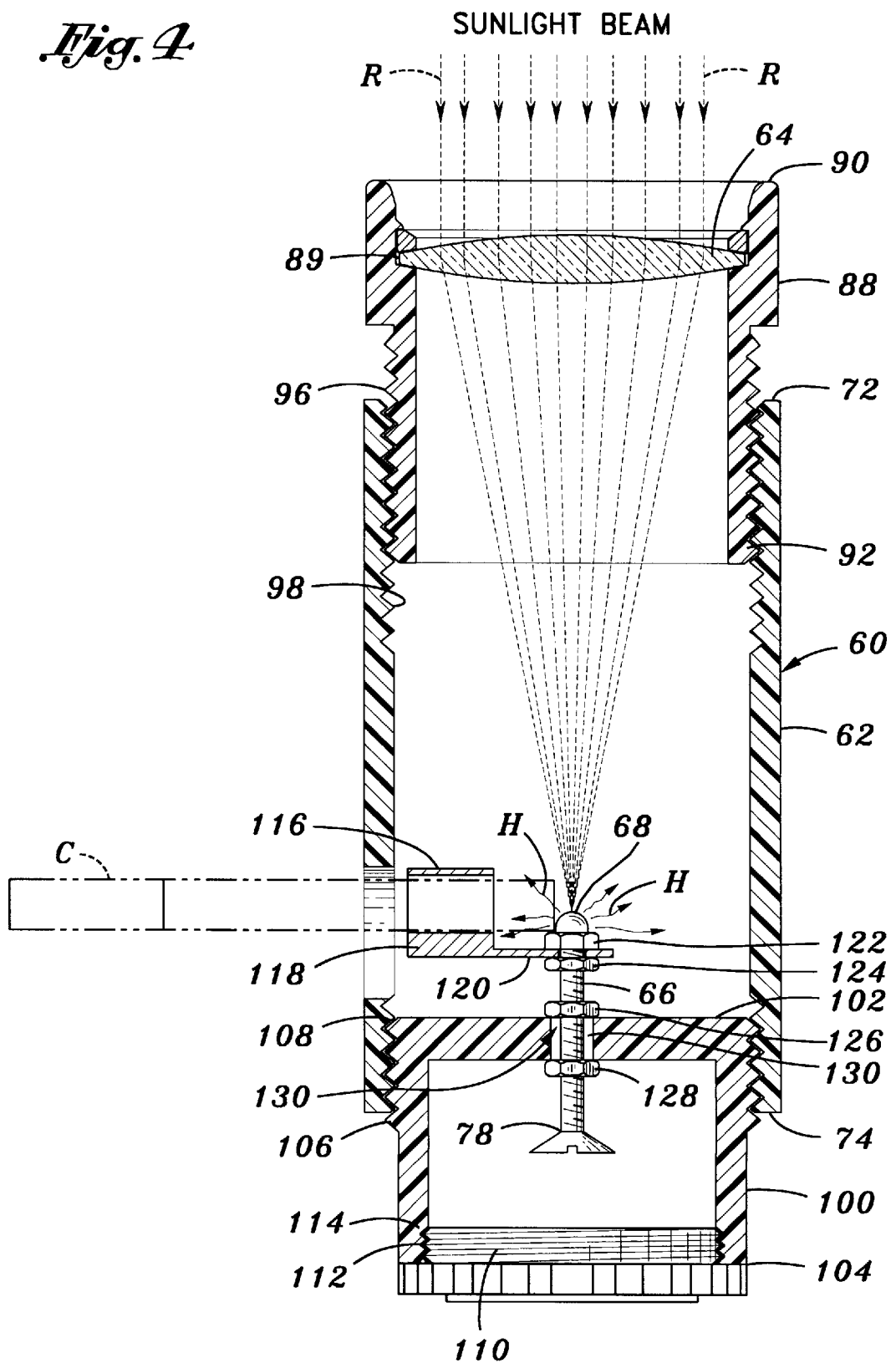

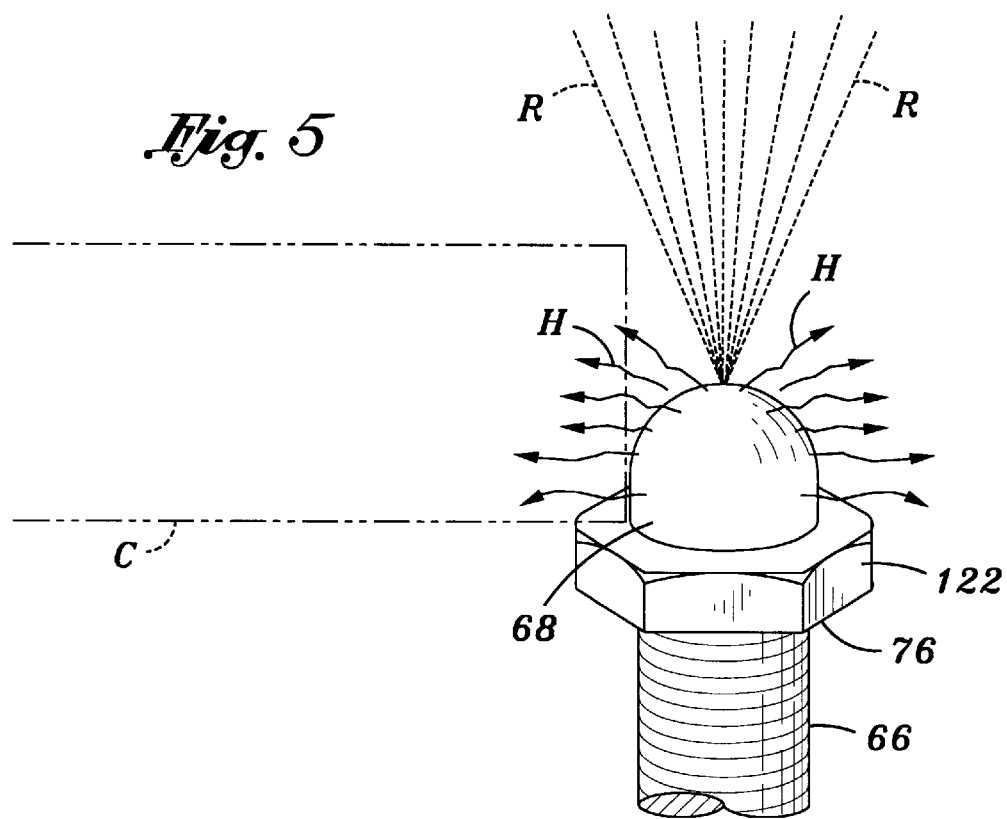
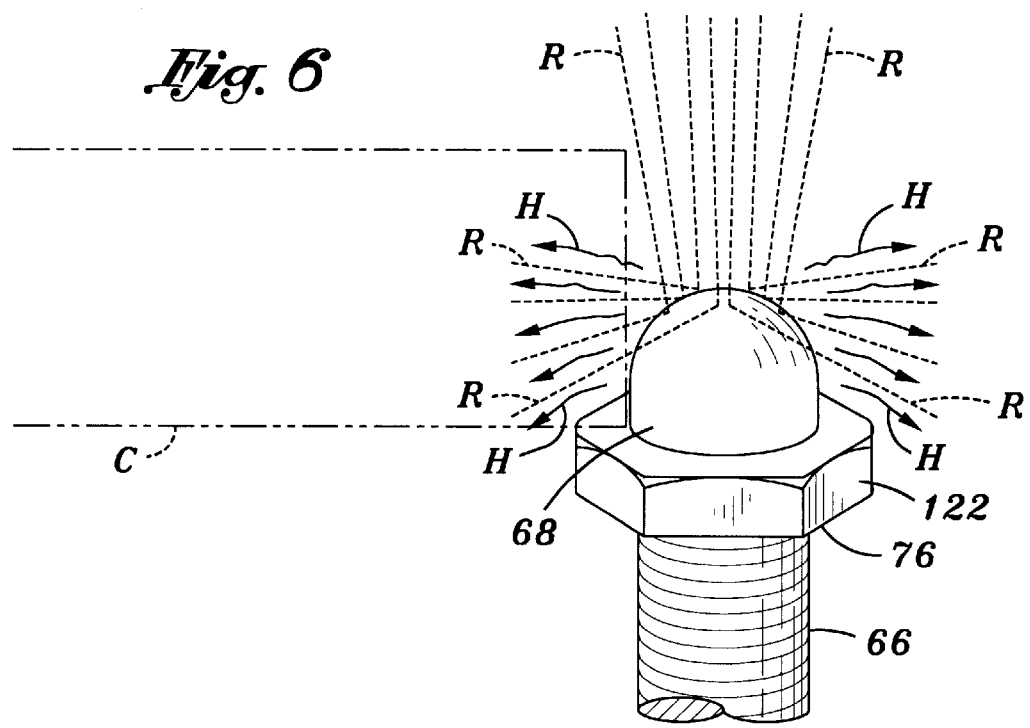

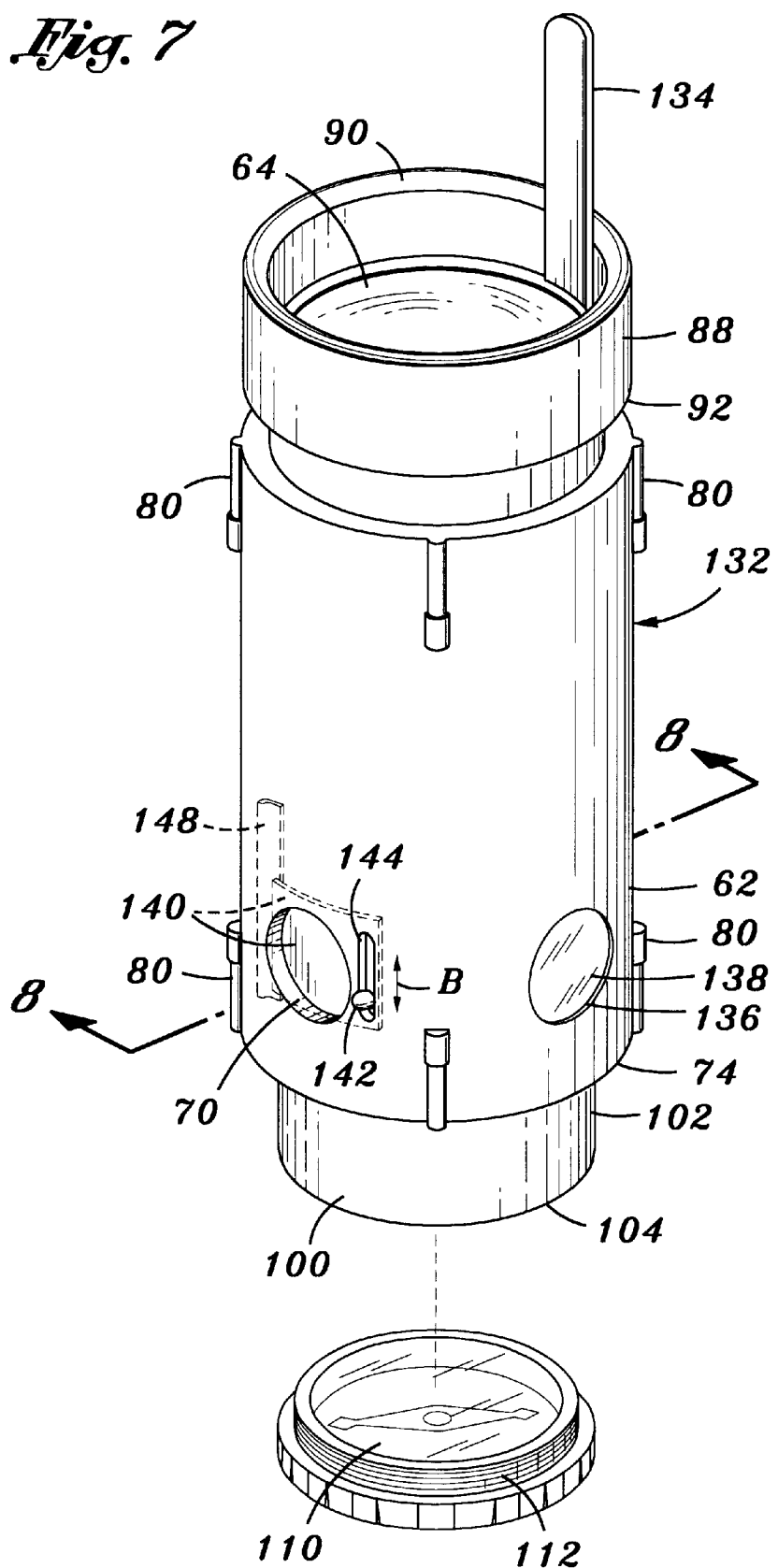

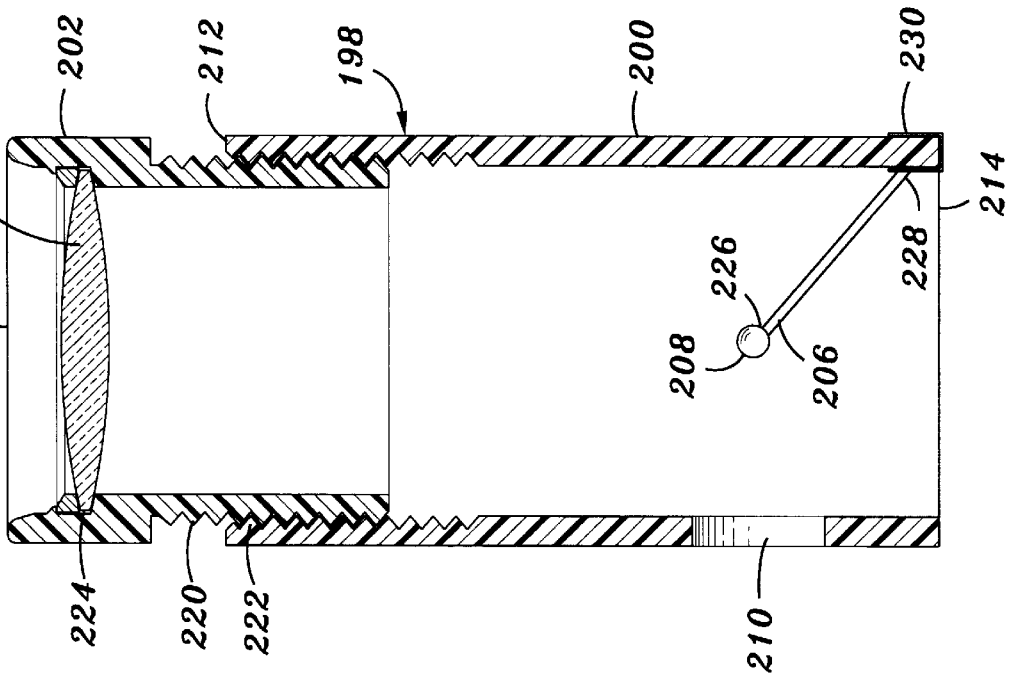
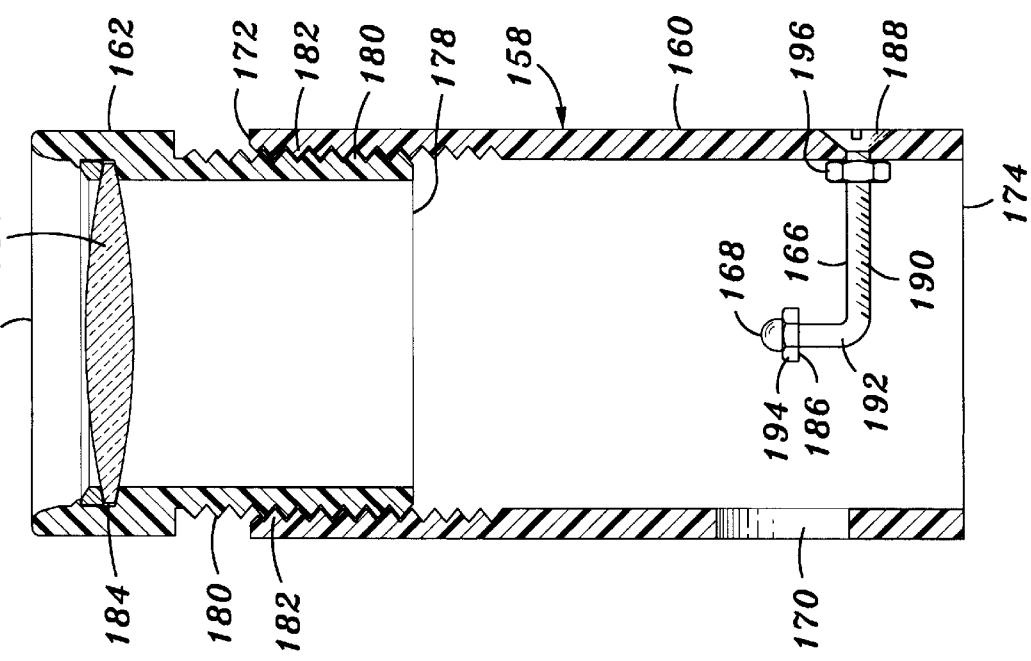

COMBINATION SOLAR POWERED CIGARETTE LIGHTER AND TELESCOPE

BACKGROUND

The present invention relates to a solar powered ignition device for igniting various solid items such as paper, wood or dry plant materials. In particular, the present invention relates to a solar powered cigarette lighter which can also be used as a sighting telescope.

An ignition device such as a cigarette lighter, usually requires a match, flint or fuel, liquid or gaseous to form the flame which lights the cigarette. The fuel, the chemical constituents of the match and the resulting smoke can contaminate the cigarette. Additionally, most lighters can sustain a flame and be used only indoors or away from any significant wind or draft. The open flame created also causes the risk of accidental forest or other fire and discarded matches are a form of environmental pollution.

Solar energy can be used as a substitute for other energy sources and various practical applications for solar energy have been developed including solar powered cigarette lighters. Existing solar powered cigarette lighters have many drawbacks and deficiencies. For example, most known solar powered cigarette lighters comprise a hollow tube with a light focusing lens at one end of the tube and require the cigarette to be inserted longitudinally into the tube at the end of the tube opposite the lens. Because it is necessary to draw air through or to suck on the non inserted end of the cigarette while ignition is being attempted, the requirement for the user to insert the cigarette into the end of the tube presents an uncomfortable and unsafe position whereby the user is constrained to look overhead (at the location of the sun), and to look directly at the sun to ensure that the tube is aligned with the lens pointed directly at the sun and to maintain such direct in line viewing of the sun in order to maintain the required alignment of the tube with inserted cigarette at the sun. It is well known that direct viewing of the sun can increase the incidence of cataracts. Additionally, the requirement for the user to crane or bend back his or her neck so as to point the lighter at the sun can be difficult or uncomfortable for some users.

Furthermore, because the lens focuses the sun light onto an invisible point, it can be difficult if not impossible for a user to know how far to insert the end of a cigarette into the lighter so as to achieve rapid ignition of the cigarette.

French patent 78 01115 illustrates a "brique solaire", apparently a solar powered cigarette lighter, where a cigarette can be inserted transversely, as opposed to longitudinally, through an opening in the side of the tube. The tube has a lens 2 at one end of the tube. The lighter of French patent 78 01115 completely lacks any means to either indicate the focal point of the lens or to guide the cigarette towards the focal point.

What is needed therefor is a solar powered cigarette lighter which does not require a user to look directly at the sun while using the lighter and which has an indicator which clearly indicates to the user where the focal point of the lens is located.

SUMMARY

The present invention meets this need and provides a solar powered ignition device which does not require a user to look directly at the sun while using the device and which has an indicator which clearly indicates to the user where the focal point of the lens is located. An embodiment within the scope of the present invention requires a cigarette to be inserted transversely through a port in the side of a hollow, lens-holding tube to a lens focal point which lens focal point is indicated by a reflector means.

A solar powered ignition device within the scope of the present invention must have at least a housing or main housing with a port in the housing, a lens, a positioning means and a reflector means. The main housing has a first end, a second end, and a side wall and a bore internal to the main housing. The lens is adapted to focus the rays of the sun. The lens being positioned near the first end of the main housing and the focal point of the lens is within the bore of the main housing. The positioning means is located within the bore of the main housing and assists the positioning of an item to be ignited. The positioning means has a first end and a second end. The first end of the positioning means is located at or near the focal point of the lens. The reflector means is located on the first end of the positioning means and functions to for reflect sunlight towards the eye of a user of the device. Finally, the port in the side wall of the main housing is adjacent to the first end of the positioning means. An item to be ignited is inserted through the port. The passage of sunlight through and focusing by the lens causes sunlight to be reflected towards the eye of a user of the solar powered ignition device so that insertion of an item to be ignited transversely through the port in the side of the main housing to the position of the reflector means results in ignition of the item.

The solar powered ignition device can further comprise a first closure means for closing the port thereby rendering the device buoyant in water. The solar powered ignition device can also have a hollow second housing with a first end and a second end. The lens is fixed in position within the hollow of the second housing in a position near the first end of the second housing. The second housing must have a diameter less than the diameter of the short axis of the main housing in the vicinity of the first end of the main housing so that the second end of the second housing can be reversibly inserted into the first end of the main housing.

The solar powered ignition device can have an exterior surface near the second end of the second housing which bears threads for engaging in mating contact with matching threads near an inner surface of the first end of the main housing thereby permitting the second housing to be reversibly screwed into the first end of the main housing.

The device can further comprise support means for supporting the positioning means and the support means is located in the bore of the main housing near the second end of the main housing. The positioning means can be a rod which is inserted through the center of the support means thereby aligning the rod along the longitudinal axis of the housing. The support means can have a cross sectional shape and diameter which is approximately equal to the cross sectional shape and diameter of the bore of the main housing as measured along a short axis of the main housing. Additionally it is preferred that the support means extend transversely across the bore of the main housing so that a circumference of the support means contacts an inner wall of the main housing in a position between the port and the second end of the main housing.

Notably, the support means can be the a first end of a third hollow housing. The third hollow housing can have a diameter less than the diameter of the short axis of the main housing in the vicinity of the second end of the main housing so that the first end of the third housing can be reversibly inserted into the second end of the main housing. An exterior surface of the third housing near the first end of the third housing bears threads which can engage in mating contact with matching threads near an inner surface of the second end of the main housing thereby permitting the third housing to be reversibly screwed into the second end of the main housing.

The second end of the positioning means can be attached to the housing or alternately, the positioning means can comprises a first linear portion adjacent to the second end of the positioning means and aligned substantially parallel to the short axis of the main housing, and a second linear portion adjacent to the first end of the positioning means and aligned substantially parallel to the longitudinal axis of the main housing.

The solar powered ignition device can further comprise a shadow casting means attached to the first end of the housing for casting a shadow onto the first end of the housing, and the device can also have a second closure means for covering an outer surface of the lens. The solar powered ignition device can also comprise a guide means adjacent to the port for guiding an item to be ignited towards the reflector means and the guide means can project inwardly from the port, so that the guide means is located within the bore of the housing.

Additional features of the solar powered ignition device can include a compass attached to the housing for indicating the position of the sun and a view port in the main housing for viewing the location of an item for ignition inserted into the bore of the main housing. The reflector means can be made of a crystalline material.

A detailed embodiment of the device can be a solar powered cigarette lighter assembly which comprises: (a) a main housing with a first end, a second end, and a side wall, the main housing defining a bore internal to the main housing; (b) a lens adapted to focus the rays of the sun, the lens being positioned near the first end of the main housing, a focal point of the lens being within the bore of the main housing; (c) a positioning means located within the bore of the main housing for assisting positioning of an item to be ignited, the positioning means being a rod having a first end and a second end, the first end of the rod located near the focal point of the lens, the rod being inserted through the center of a support means thereby aligning the rod along the longitudinal axis of the housing; (d) a reflector means on the first end of the positioning means for reflecting sunlight towards an eye of a user of the solar powered ignition device; (e) a port in the side wall of the main housing adjacent to the first end of the positioning means through which an item to be ignited can be inserted; (f) a first closure means for closing the port thereby rendering the device buoyant in water; (g) a hollow second housing with a first end and a second end, the lens being fixed in position within the hollow of the second housing in a position near the first end of the second housing, the second housing having a diameter less than the diameter of the short axis of the main housing in the vicinity of the first end of the main housing so that the second end of the second housing can be reversibly inserted into the first end of the main housing; (h) a support means for supporting the positioning means, the support means being located in the bore of the main housing near the second end of the main housing the support means having a cross sectional shape and diameter approximately equal to the cross sectional shape and diameter of the bore of the main housing as measured along a short axis of the main housing, the support means extending transversely across the bore of the main housing so that a circumference of the support means contacts an inner wall of the main housing in a position between the port and the second end of the main housing, and; (i) a third hollow housing with a first end and a second end, the third housing having a diameter less than the diameter of the short axis of the main housing in the vicinity of the second end of the main housing so that the first end of the third housing can be reversibly inserted into the second end of the main housing, the support means covering is the first end of the third hollow housing, so that the passage of sunlight through and focusing by the lens causes sunlight to be reflected towards the eye of a user of the solar powered ignition device so that insertion of an item to be ignited transversely through the port in the side of the main housing to the position of the reflector means results in ignition of the item.

Also within the scope of the present invention is a method for using a solar powered cigarette lighter, where the lighter comprises: a housing with a first end, a second end and a side wall, the housing defining a bore internal to the housing; (b) a lens near the first end of the housing, a focal point of the lens being in the bore within the housing; (c) a positioning means for assisting the positioning of an item to be ignited, the positioning means having a first end and a second end, the first end of the positioning means being located near the focal point of the lens, the positioning means being attached to the housing; (d) a light reflecting means on the first end of the positioning means for reflecting sunlight, and; (e) a port in the side wall of the housing adjacent to the first end of the positioning means. The method comprises the steps of: (1) pointing the first end of the first housing towards the sun, (2) inserting a cigarette through the port up to the positioning means, (3) resting the cigarette against the positioning means until the inserted end of the cigarette ignites, and (4) removing the cigarette from the port.

A method for making a telescope, comprising the steps of removing the third housing from the solar powered cigarette lighter and replacing the third housing with an objective lens inserted into the second end of the main housing is also within the scope of the present invention.

DRAWINGS

These and other features, aspects, and advantages of the present invention can become better understood from the following description, claims and the accompanying drawings where:

FIG. 1 is a perspective view of a first embodiment within the scope of the present invention.

FIG. 2 is a perspective view of a second embodiment within the scope of the present invention.

FIG. 3 is a perspective, exploded view of a third embodiment within the scope of the present invention.

FIG. 4 is an assembled, partial cross sectional view taken along the line 4—4 of the embodiment illustrated by FIG. 3 with the focusing action of the lens upon sunlight indicated.

FIG. 5 is a detail, perspective view of the first end of the positioning means shown in FIG. 4 with the guide means removed and where the first end of the positioning means is aligned at the focal point of the lens.

FIG. 6 is a detail, perspective view of the first end of the positioning means shown in FIG. 5, where the first end of the positioning means is positioned above the focal point of the lens.

FIG. 7 is a perspective, exploded view of a fourth embodiment within the scope of the present invention.

FIG. 9 is a partial cross sectional view of a fifth embodiment within the scope of the present invention.

FIG. 10 is a partial cross sectional view of a sixth embodiment within the scope of the present invention.

DESCRIPTION

Figure 8:
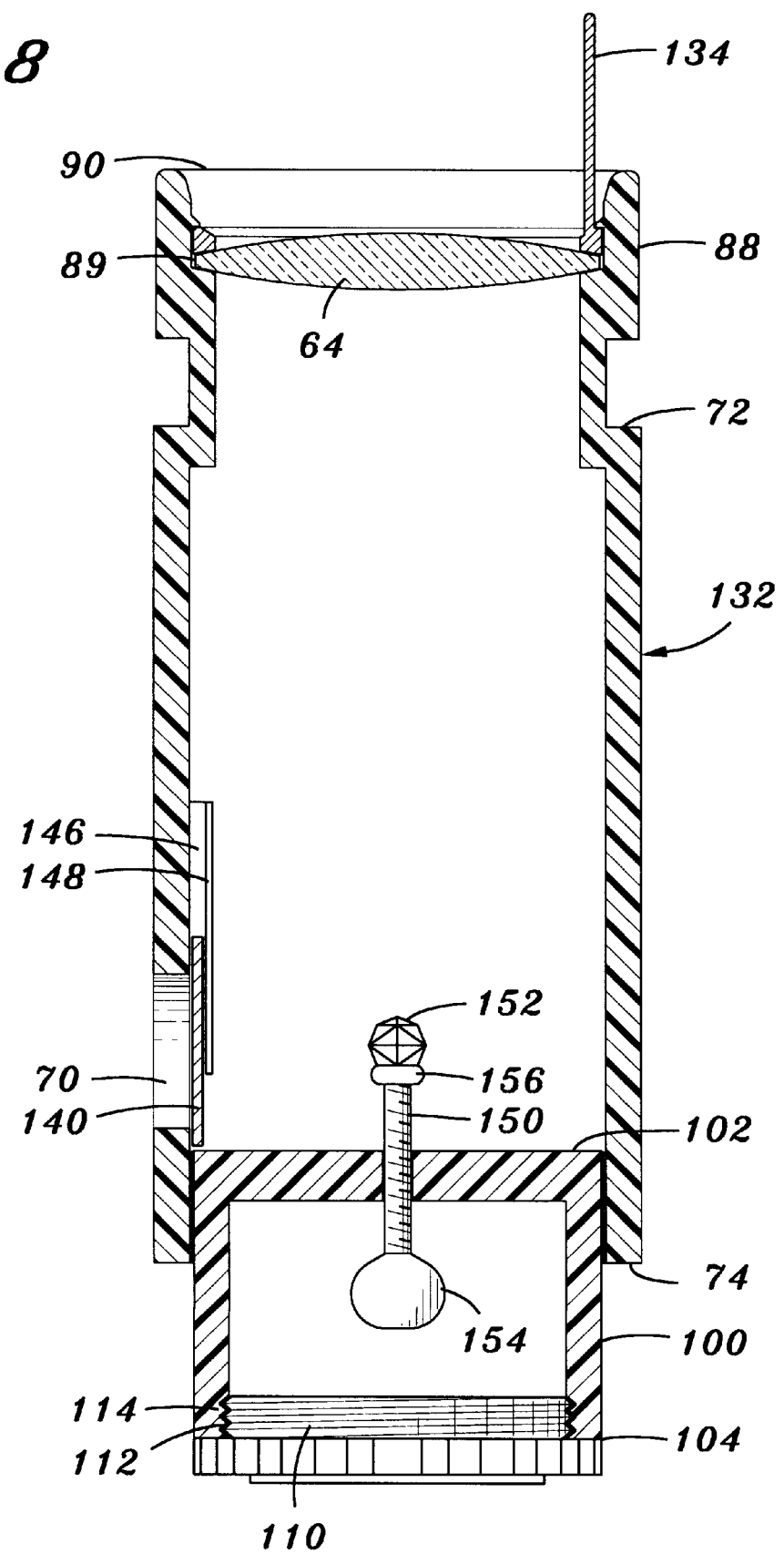
FIG. 8 is an assembled, partial cross-sectional view taken along the line 8—8 of the fourth embodiment illustrated by FIG. 7.

The present invention is based upon the discovery that a solar powered ignition device which does not require a user to look at the sun while using the device, can be constructed and used by transversely inserting an end of an item to be ignited into a port in the side of a hollow tube to one end of which hollow tube there is attached a light focusing lens which focuses light onto a reflector means held in place at the focal point of the lens by a positioning means.

Various materials such as paper, small pieces of wood, fishing line, cigarettes, cigars and the like can be ignited using the ignition device described herein. The device cannot be used at night or in a location where the sun is obscured. The device has the considerable advantage that it can ignite an inserted item irrespective of the presence of a considerable wind.

A side wall of a main housing of the device must have a port or opening through which one end of the material to be ignited can be inserted into the side of the tube which comprises the main housing. The port is positioned so that the material to be ignited can be positioned adjacent to the focus of the lens. An end of a positioning means is positioned at or near the focal point of the lens. The port can have a dimension larger than the diameter of a cigarette so that the end of the cigarette which is inserted into the port is clearly visible through the port. A second port about 90 degrees along the circumference of the housing from the first port can be used to view the inserted end of the cigarette within the housing.

When a solar powered cigarette lighter within the scope of the present invention is placed in the path of rays of sunlight from the sun, the lens focuses the rays onto the inserted end of the cigarette. The lighter is so constructed that the non-inserted end of the cigarette can be held in the mouth of a user to assist ignition of the inserted end of the cigarette.

First Embodiment

As shown by FIG. 1, a first embodiment constructed according to the present invention can comprise a solar powered ignition device 10 which has a housing or main housing 12, a lens 14, a positioning means 16, a reflector means 18, and a port 20 in the housing 12. The main housing 12 is preferably a tubular member with a first end 22 and a second end 24 which can be easily held in one hand of a user. The main housing 12 is hollow and thereby defines a throughbore within the housing 12 in which can be arranged components of the invention. The main housing 12 can be constructed from any suitable material such as a metal, wood or plastic. Plastic is preferred because of its low cost and the main housing 12 can be made by well known injection molding techniques. Thus, the main housing 12 forms a hollow cylinder so that over at least a portion of its length the main housing has the free inside diameter 26.

At or near the first end 22 of the main housing 12 there is fixed in position the lens 14 adapted to focus the rays of the sun at a focal point within the bore of the main housing 12. The lens 14 can be fixed to the main housing 12 by being received by detent action in an annular groove in the inner surface of the housing 12 or be being glued or otherwise adhered in place. The diameter of the lens preferably corresponds to he inside diameter of the first end 22 of the housing 12 so that the lens 14, which need not be of a high optical quality, has a large light gathering surface enabling it to rapidly ignite an item to be ignited. The lens 14 has a positive power and can be biconvex in shape and can be made of glass or other suitable plastic.

The positioning means 16 is the element of the invention which indicates where a user of the invention should place an item to be ignited within the bore in the housing 12. The positioning means, which can be a rod, pin, nail, small tube or the like, so functions by indicating where the focal point of the lens 14 is within the bore of the housing 12. The positioning means is preferably a metallic rod with a first end 26 and a second end 28. Importantly, the lens 14 is spaced by substantially the length of one focal length of the lens 14 from the first end 26 of the positioning means 16.

The reflector means 18 is an essential and required element of all embodiments of the present invention. The reflector means is located on the first end 26 of the positioning means at the focal point of the lens 14 within the bore of the housing 12. The reflector means can be any substance or material which can reflect or refract sunlight towards the eye of a user. Optical alignment of the focal point of the lens 14 onto the reflector means 18 is crucial to the function of the present invention.

A support means for supporting the positioning means 16 can be located within the bore of the main housing 12 near the second end 24 of the main housing 12. The support means can be a plate 29 with a diameter matching that of the bore so that the plate 29 is fixed firmly in position within the bore. The plate 29 can be located at any position within the bore of the main housing in relation to the port 20 and the reflector means 18 so that the reflector means is positioned at the focal point of the lens 14 and opposite the port 20 in the side wall of the main housing 12.

Second Embodiment

FIG. 2 illustrates a second embodiment constructed according to the present invention which comprises a solar powered ignition device 30 which has a housing or main housing 32, a lens 34, a positioning means 36, a reflector means 38, and a port 40 in the housing 32. The housing 32 can be cylindrical or four sided as shown in FIG. 2. Additional aspects of the second embodiment include a first end 42 of the housing 32, a second end 44 of the housing 32, a first end 46 of the positioning means 36, and a second end 48 of the positioning means 36.

The second embodiment differs significantly from the first embodiment by provision of a second hollow housing 50 which has a first end 52 and a second end 54. The second end 54 of the second housing 50 has an outside diameter only slightly less than the inside diameter of the first end 42 of the main housing 32 so that the second end 54 of the second housing 52 can be slidably inserted into the first end 42 of the main housing 32. The second housing 50 permits the focal point of the lens 34 to be focused only the reflector means 38 as indicated by the arrows A. Ridges or flanges 56 and 58 on the outside surface of the second housing 50 act to prevent the second housing 50 from being pushed too far into or from being pulled out of the main housing. The second embodiment therefore provides a mechanism for focusing the solar powered ignition device. A plate 59 analogous in function to the plate 29 of the first embodiment can also be present.

Third Embodiment

FIGS. 3 to 6 illustrate a third embodiment constructed according to the present invention which comprises a solar powered ignition device 60 which has a main housing 62, a lens 64, a positioning means 66, a reflector means 68, and a port 70 in the side wall of the main housing 62. The main housing 62 is preferably cylindrical in shape. Additional aspects of the third embodiment include a first end 72 of the main housing 62, a second end 74 of the housing 62, a first end 76 of the positioning means 66, and a second end 78 of the positioning means 36. The main housing 62 can have a set of strengthening ribs 80 near the first and the housing 62, and 74 of the housing 62.

A closure means such as a cork 82 can be used to close the port 70. The cork 82 can be attached to the housing 62 by a leash 84. A strap 86 also attached to the housing 62 permits the device 60 to be hung up on a nail or hook when not in use and also permits the device 60 to be carried on a user's wrist.

The lens 64 is fixed in place within the bore of a second housing 88 by being held in place by the detent action of annular groove 89. The second housing 88 has a first end 90 and a second end 92. A second closure means such as a removable cap 94 can be placed over the second end 90 to protect the lens 64. An outside surface of the second housing 88 near the second end 92 can bear threads 96 which mate with threads 98 on an inside surface near the first end 72 of the main housing 62 thereby permitting the second housing 88 to be screwed into the main housing 62.

A third housing 100 with a first end 102 and a second end 104 104 can be screwed into the second end 74 of the main housing 62 through the mating contact of threads 106 on an outer surface of third housing 100 near first end 102 with threads 108 on an inner surface of main housing 62 near second end 74. A compass 110 can be screwed into the second end 104 of the third housing 100 by the mating contact of threads 112 on an outer surface of compass 110 with threads 114 on an inner surface near the second end 104 of the third housing 100. The compass 110 can assist pointing the device 60 appropriately towards the sun. Thus when the sun is rising above the horizon or is obscured by clouds the compass can be used to indicate the location of the sun, i.e. in the east in the early morning and in the west in the late afternoon.

A guide means 116 can be used to guide the end of a cigarette C towards the reflector means 68. The guide means can have a short tubular section 118 with a diameter somewhat greater than the diameter of a typical cigarette. The short tubular section is integral with a prong 120 which joins the tubular section 118 to the positioning means 66 by interposition of prong 120 between adjustable nuts 122 and 124. Another version of the guide means can be substantially arcuate in cross section and be defined adjacent either the outside or inside, or both sides of the port 70. Preferably, the guide means is fixed wholly inside the bore to remove it as an obstruction on the outer surface of the housing. The guide means extends horizontally from the port towards the light reflecting means. The guide means is so positioned in relation to the lens that the end of the cigarette once inserted is at the focus of the lens 64. The light reflecting means 68 can act as a stop to ensure that the inserted end of the cigarette C is correctly aligned with the focus of the lens.

The guide means permits an object to be ignited by the focused rays of the sun, such as a cigarette, to be slidably received and guided transversely, that is along the short axis of the tubular housing, into the bore of the housing and towards the light reflecting means where the focus of the lens is located.

Adjustable nuts 126 and 128 permit positioning of a bolt which comprises the positioning means 66 longitudinally within the bore towards or away from the lens 64. An important additional function of nuts 126 and 128 is to permit transverse positioning of the positioning means 66 towards or away from the port 70 within the bore 130 formed in the first end 102 of the third housing 100. Thus, lateral, or side to side movement of the positioning means 66 can be accomplished by loosening the retaining nuts 126 and 128 and displacing the positioning means 66 within the space provided by the bore 130.

The longitudinal and transverse movements of the positioning means permitted by adjustment of nuts 126 and 128 allows precise positioning of the reflector means at the focal point of the lens 64. Thus, when a beam of sunlight composed of light rays R is focused by lens 64 onto an incorrectly positioned reflector means 68, which reflector means can be a shiny, metal cap, little heat is generated on the cap as shown best by FIG. 5 and some of this heat H is radiated away. Essentially no sunlight R is reflected from the reflector means towards the eye of a use rendering the reflector means useless as an indicator of the position of the focal point of the lens. With such a faulty positioning of the reflector means 68, the inserted end of a cigarette C cannot be readily ignited.

When, as shown by FIG. 6, the reflector means 68 is correctly positioned so that the focal point of the lens 64 forms just below the surface of the reflector means 68, then abundant heat is generated on the cap and sufficient light R is reflected from the reflector means 68 towards the eye of a user so that the reflector means 68 becomes sufficiently hot to permit ready ignition of the end of the inserted cigarette C. Additionally, the reflector means 68 now functions as an illuminated, visual indicator of the position of the focal point of the lens 64. Proper alignment of the lens and the reflector means is crucial to the function of all embodiments of the present invention.

The reflector means is attached to the first end of the positioning means. In the first embodiment shown by FIG. 1 the lens and positioning means are in fixed positions relative to each other. In a second embodiment (FIG. 2), the lens is contained within a second housing and the position of the lens relative to the positioning means can be adjusted. In an embodiment of the invention which is no illustrated, only the positioning means, as opposed to the lens, is contained within a removable end piece which permits the position of the position means in relation to the lens to be adjusted. In a third illustrated embodiment of the present invention (FIGS. 3–6), the main housing has a second housing in movable contact with the first end of the main housing and a third housing in movable contact with the second end of the main housing, so that in the third embodiment, both the positions of the lens and of the positioning means relative to each another can be adjusted.

Fourth Embodiment

FIGS. 7 and 8 illustrate a fourth embodiment, a solar powered ignition device 132, within the scope of the present invention. The same identifying numerals are used in FIGS. 7 and 8 as they are in FIGS. 3–6, where the parts of the device 132 are the same as the parts of the device 60. In the device 132 the second housing can be slidably inserted or threaded into or integral with the main housing as shown by FIGS. 7–8. Additionally, the third housing 100, as shown by FIG. 8, can be slidably inserted in a reversibly manner into and out of the second end 74 of the main housing 62, because the diameter of first end 102 of the third housing 100 is less than the diameter of the second end 74 of the main housing 62 of the device 132.

The device 132 can have a shadow casting element 134 which casts a shadow onto the lens 64 when the device 134 is inappropriately aligned in relation to the location of the sun. When the device 132 is appropriately aligned towards the sun, a nominal or insignificant shadow will be cast by the element 134 onto the lens 64 or onto a cap which may be covering the lens 64.

The device 132 can have a second port 136 separated from the first port 70 by about 90 degrees along the circumference of the cylindrical main housing 62. Port 136 is covered by a transparent material 138, such as a suitable plastic. Port 136 permits a user of the device 132 to view the alignment and location of the end of a cigarette inserted through port 70. The material 138 by covering the port 136 in a water tight fashion prevents the provision of a port 136 from negatively affecting the buoyancy of the device 132 in water, while the port 70 is also closed.

An alternate closure means for the port 70 is indicated by FIGS. 7 and 8. A plate 140 can be moved up and down across an inside face of the port 70, as indicated by the arrows at B, at the urging of toggle 142, which is attached to the plate 140, along the longitudinal opening 144. The plate 140 is shown in FIG. 7 and in FIG. 8 in the position which closes off the port 70. Movement of the toggle 142 along the opening 144 slides the plate 140 in a space 146 formed within an enclosure 148 for receiving an end of the plate 140.

The device 132, as well as other embodiments of the present invention, can have an alternate version of a positioning means 150 and of a reflector means 152. The positioning means can be a rod or bolt with a lower end wing tip 154, rotation of which permits adjustment of the position of the positioning means 150, once the compass 110 has been removed. Set in position on an upper end 156 of the positioning means 150 is the reflector means 152 which can comprise a highly light reflective crystalline material. The crystalline material can function as a beacon pointing out the precise location of the focal point of the lens 64 when the device 132 is correctly pointed towards the sun.

Fifth Embodiment

FIG. 9 illustrates a fifth embodiment of a solar powered ignition device 158 within the scope of the present invention comprising a cylindrical housing 160, a second housing 162, a lens 164, a positioning means 166, a reflector means 168 and a port 170 in the side of the housing 160 opposite the reflector means 168. The housing 160 can have a first end 172 and a second end 174. The second housing 162 has a first end 176 and a second end 178. Threads 180 on an outside surface of the second housing 162 near the second end 178 can mate with threads 182 on an inside surface of the housing 160 near the first end 172. In this manner the second housing 162 can be reversibly screwed into the housing 160 and the position of the lens 164 in relation to the reflector means 168 adjusted. Alternately, both the second end 178 of the second housing 162 and the first end 172 of the housing 160 can lack any threads butt the second end 178 of the second housing 162 can have a diameter less than the diameter of the first end 172 of the housing 160 thereby permitting the second housing to be slidably and reversibly inserted into the housing 162.

The lens 164 is held in position in the second housing 162 by the detent action of an annular groove 184. The positioning means 166 can have a first end 186 and a second end 188. The positioning means 166 can further comprise a first linear 190 portion adjacent to the second end 188 of the positioning means and aligned substantially parallel to the short axis of the housing 160. The positioning means 166 can also comprise a second linear portion 192 adjacent to the first end 186 of the positioning means 166 and aligned substantially parallel to the longitudinal axis of the housing 160. A first nut 194 can retain the reflector mains 168 in place on the first end 186 of the positioning means 166, while a second nut 196 can retain the second end 188 of the positioning mean 166 in rigid contact with the housing 160.

Sixth Embodiment

FIG. 10 illustrates a sixth embodiment of a solar powered ignition device 198 within the scope of the present invention comprising a cylindrical housing 200, a second housing 202, a lens 204, a positioning means 206, a reflector means 208 and a port 210 in the side of the housing 200 opposite the reflector means 208. The housing 200 can have a first end 212 and a second end 214. The second housing 202 has a first end 216 and a second end 218. Threads 220 on an outside surface of the second housing 202 near the second end 218 can mate with threads 222 on an inside surface of the housing 200 near the first end 212. In this manner the second housing 202 can be reversibly screwed into the housing 200 and the position of the lens 204 in relation to the reflector means 208 adjusted. Alternately, both the second end 218 of the second housing 202 and the first end 212 of the housing 200 can lack any threads but the second end 218 of the second housing 202 can have a diameter less than the diameter of the first end 212 of the housing 200 thereby permitting the second housing 202 to be slidably and reversibly inserted into the housing 162.

The lens 204 is held in position in the second housing 202 by the detent action of an annular groove 224. The positioning means 206 can have a first end 226 and a second end 228. The positioning means 206 can comprise a single linear portion of which the second end 228 is attached directly to the housing 200 by an attachment means such as a retaining nut or a retaining bracket 230. The second end 228 of the positioning means 206 bears the reflector means 208 which is aligned at the focal point of the lens 204.

In alternate versions of the solar powered ignition devices set forth above, the focal point of the lens is aligned so that the focal point of the lens is just above the reflector means. Ample light is still reflected from the reflector means towards the eye of a user, while the item to be ignited can now be ignited by being placed above the reflector means.

Telescope

Figure 11:
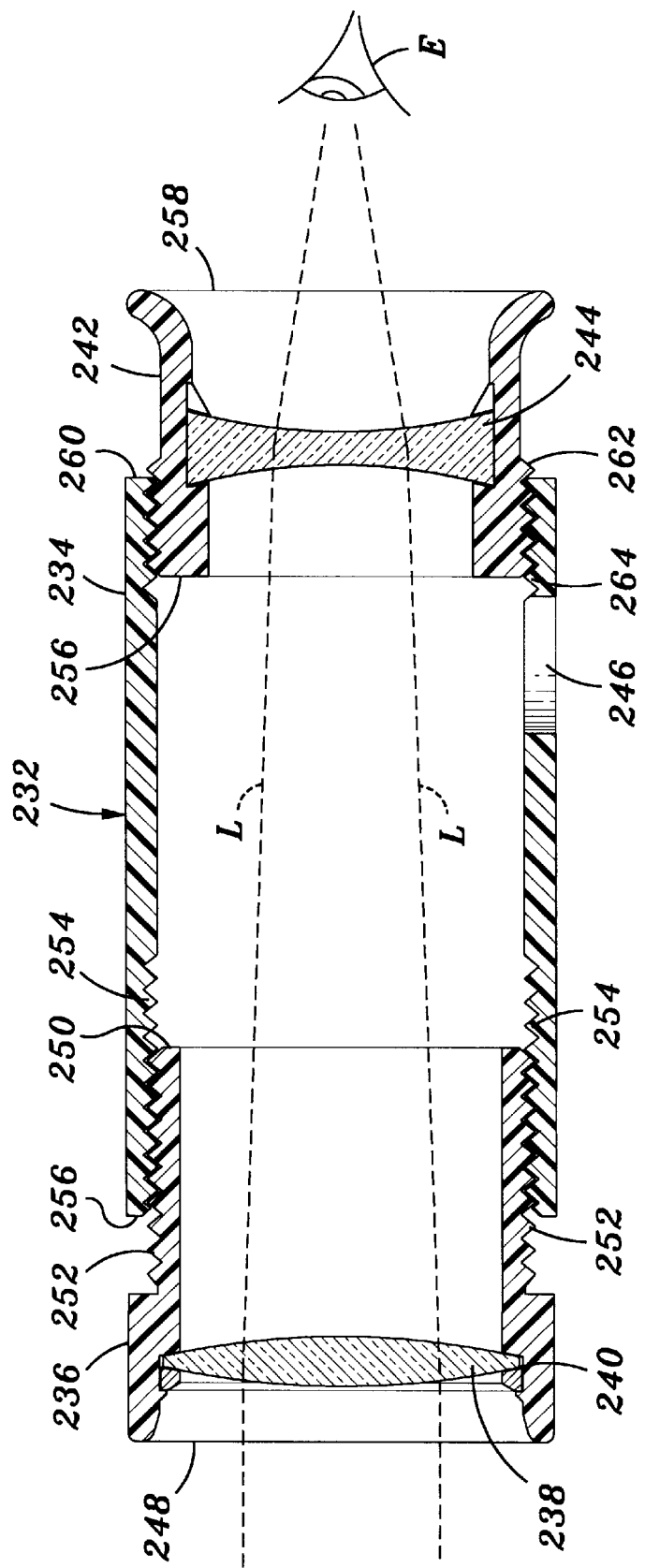
FIG. 11 is a cross sectional view of a telescope within the scope of the present invention.

FIG. 11 illustrates a further embodiment within the scope of the present invention. A telescope can be constructed by removing a third housing of a solar powered ignition devise and replacing the third housing by an objective lens. Thus, the third housing 100 of a device 60 within the scope of the third embodiment set forth above can be removed and replaced by an eyepiece thereby constructing a telescope. Similarly, the third housing 100 of a device 132 within the scope of the fourth embodiment set forth above can be removed and replace by an eyepiece thereby again constructing a telescope. Such a telescope 232 can comprise a housing 234, a second housing 236 bearing a lens 238 in an annular grove 240, and a third housing or eyepiece 242 bearing an objective lens 244.

A port 246 remains in the side of the housing 234. The second housing 236 has a first end 248 and a second end 250. An outside surface of the second housing 236 near the second end 250 can bear threads 252 which mate with threads 254 on an inside surface near a first end 256 of the main housing 234 thereby permitting the second housing 236 to be screwed into the housing 234.

The eyepiece 242 has a first end 256 and a second end 258 which can be screwed into a second end 260 of the housing 234 through the mating contact of threads 262 on an outer surface of eyepiece 242 near first end 256 with threads 264 on an inner surface of housing 234 near second end 260. In this manner, light L can be focused onto an eye E of a user.

Within the scope of the present invention is a method for using the solar powered cigarette lighter by pointing the lens towards the sun so that the reflector means is illuminated, inserting the end of a cigarette through the port to the illuminated reflector means, retaining the cigarette in place against the illuminated reflector means until the inserted end of the cigarette ignites and removing the cigarette back through the port. Also within the scope of the present invention is a method for making a telescope by removing the third housing and replacing the third housing with a suitably sized eyepiece.

The solar powered ignition devices set forth herein can be used to carry items such as keys, cigarettes, and money within the bore of the main housing. For example, the second or third housing can be removed, personal items placed in the bore and the second or third housing replaced.

Figure 12:
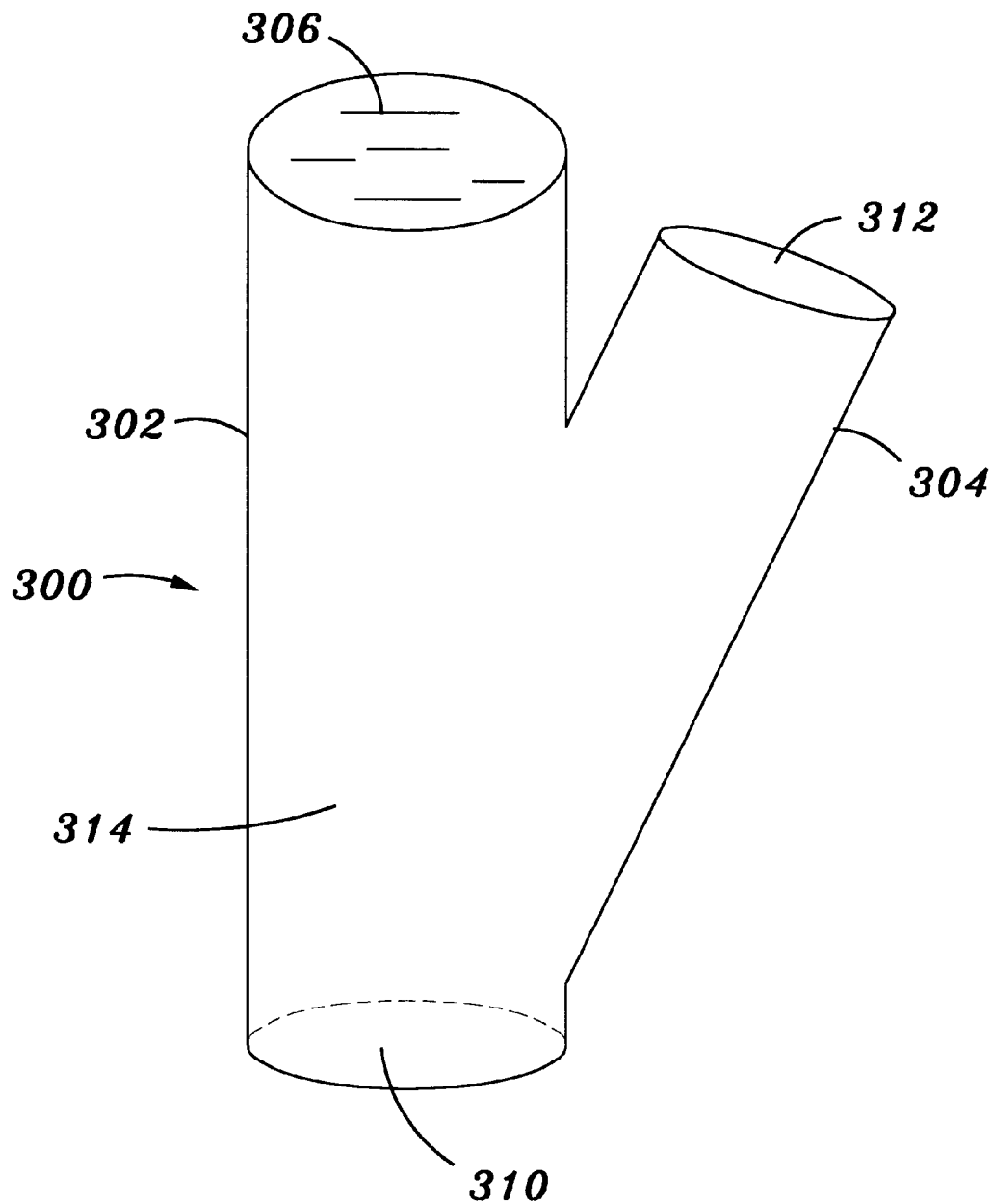
FIG. 12 is perspective view of a smoke chamber device.

Also within the scope of the present invention is a smoke chamber, an embodiment which is illustrated by FIG. 12. A smoke chamber 300 can comprise a main housing 302 to which is affixed a second housing 304. A lens 306 is attached at one end of the main housing 302. The lens 306 focuses sunlight onto a focal point 310 at an end of the main housing 302 opposite the lens 306. An item tot be ignited is placed at the focal point 310 and is observed by a user of the smoke chamber through open view port 312. I have found that appropriate selection and placement of suitable combustible material at the focal point 310 followed by the passage of sunlight through the lens 306 can result in the generation of considerable amounts of smoke which can be observed rising and swirling within the bore 314.

A solar powered ignition device according to the invention disclosed herein has many advantages, including the following:

1. it requires no fuel, matches or flame.
2. it can be used outdoors or through a sunny window.

Although the present invention has been described in detail with regard to certain preferred methods, other embodiments, versions, and modifications within the scope of the present invention are possible. For example, a wide variety of housings (first, second and third) and eyepiece configurations, shapes and diameters are possible.

Accordingly, the spirit and scope of the following claims should not be limited to the descriptions of the embodiments set forth above.

I claim:

1. A solar powered ignition device, comprising:
   (a) a main housing with a first end, a second end, and a side wall, the main housing defining a bore internal to the main housing;
   (b) a lens adapted to focus the rays of the sun, the lens being positioned near the first end of the main housing, a focal point of the lens being within the bore of the main housing;
   (c) a positioning means located within the bore of the main housing for assisting positioning of an item to be ignited, the positioning means having a first end and a second end, the first end of the positioning means being located near the focal point of the lens;
   (d) a reflector means on the first end of the positioning means for reflecting sunlight towards an eye of a user of the solar powered ignition device, and;
   (e) a port in the side wall of the main housing adjacent to the first end of the positioning means through which an item to be ignited can be inserted,
   whereby the passage of sunlight through and focusing by the lens causes sunlight to be reflected towards the eye of a user of the solar powered ignition device so that insertion of an item to be ignited transversely through the port in the side of the main housing to the position of the reflector means results in ignition of the item.

2. The solar powered ignition device of claim 1, further comprising a first closure means for closing the port thereby rendering the device buoyant in water.

3. The solar powered ignition device of claim 2, further comprising a hollow second housing with a first end and a second end, the lens being fixed in position within the hollow of the second housing in a position near the first end of the second housing, the second housing having a diameter less than the diameter of the short axis of the main housing in the vicinity of the first end of the main housing so that the second end of the second housing can be reversibly inserted into the first end of the main housing.

4. The solar powered ignition device of claim 3, wherein an exterior surface near the second end of the second housing bears threads which can engage in mating contact with matching threads near an inner surface of the first end of the main housing thereby permitting the second housing to be reversibly screwed into the first end of the main housing.

5. The solar powered ignition device of claim 2, further comprising support means for supporting the positioning means, the support means being located in the bore of the main housing near the second end of the main housing.

6. The solar powered ignition device of claim 5, wherein the positioning means is a rod which is inserted through the center of the support means thereby aligning the rod along the longitudinal axis of the housing.

7. The solar powered ignition device of claim 5, wherein the support means has a cross sectional shape and diameter approximately equal to the cross sectional shape and diameter of the bore of the main housing as measured along a short axis of the main housing, the support means extending transversely across the bore of the main housing so that a circumference of the support means contacts an inner wall of the main housing in a position between the port and the second end of the main housing.

8. The solar powered ignition device of claim 7, wherein the support means is a first end of a third hollow housing, the third hollow housing having a diameter less than the diameter of the short axis of the main housing in the vicinity of the second end of the main housing so that the first end of the third housing can be reversibly inserted into the second end of the main housing.

9. The solar powered ignition device of claim 8, wherein an exterior surface of the third housing near the first end of the third housing bears threads which can engage in mating contact with matching threads near an inner surface of the second end of the main housing thereby permitting the third housing to be reversibly screwed into the second end of the main housing.

10. The solar powered ignition device of claim 2, wherein the second end of the positioning means is attached to the housing.

11. The solar powered ignition device of claim 10, wherein the positioning means comprises:
   (a) a first linear portion adjacent to the second end of the positioning means and aligned substantially parallel to the short axis of the main housing, and;
   (b) a second linear portion adjacent to the first end of the positioning means and aligned substantially parallel to the longitudinal axis of the main housing.

12. The solar powered ignition device of claim 2, further comprising shadow casting means attached to the first end of the housing for casting a shadow onto the first end of the housing.

13. The solar powered ignition device of claim 2, further comprising a second closure means for covering an outer surface of the lens.

14. The solar powered ignition device of claim 2, further comprising a guide means adjacent to the port for guiding an item to be ignited towards the reflector means.

15. The solar powered ignition device of claim 14, wherein the guide means projects inwardly from the port, so that the guide means is located within the bore.

16. The solar powered ignition device of claim 2, further comprising a compass attached to the housing for indicating the position of the sun.

17. The solar powered ignition device of claim 2, further comprising a view port in the main housing for viewing the location of an item for ignition inserted into the bore of the main housing.

18. The solar powered cigarette lighter of claim 2, wherein the reflector means comprises crystalline material.

19. A solar powered cigarette lighter assembly, comprising:
   (a) a main housing with a first end, a second end, and a side wall, the main housing defining a bore internal to the main housing;
   (b) a lens adapted to focus the rays of the sun, the lens being positioned near the first end of the main housing, a focal point of the lens being within the bore of the main housing;
   (c) a positioning means located within the bore of the main housing for assisting positioning of an item to be ignited, the positioning means being a rod having a first end and a second end, the first end of the rod located near the focal point of the lens, the rod being inserted through the center of a support means thereby aligning the rod along the longitudinal axis of the housing;
   (d) a reflector means on the first end of the positioning means for reflecting sunlight towards an eye of a user of the solar powered ignition device;
   (e) a port in the side wall of the main housing adjacent to the first end of the positioning means through which an item to be ignited can be inserted;
   (f) a first closure means for closing the port thereby rendering the device buoyant in water;
   (g) a hollow second housing with a first end and a second end, the lens being fixed in position within the hollow of the second housing in a position near the first end of the second housing, the second housing having a diameter less than the diameter of the short axis of the main housing in the vicinity of the first end of the main housing so that the second end of the second housing can be reversibly inserted into the first end of the main housing;
   (h) a support means for supporting the positioning means, the support means being located in the bore of the main housing near the second end of the main housing the support means having a cross sectional shape and diameter approximately equal to the cross sectional shape and diameter of the bore of the main housing as measured along a short axis of the main housing, the support means extending transversely across the bore of the main housing so that a circumference of the support means contacts an inner wall of the main housing in a position between the port and the second end of the main housing, and;
   (i) a third hollow housing with a first end and a second end, the third housing having a diameter less than the diameter of the short axis of the main housing in the vicinity of the second end of the main housing so that the first end of the third housing can be reversibly inserted into the second end of the main housing, the support means covering is the first end of the third hollow housing, whereby the passage of sunlight through and focusing by the lens causes sunlight to be reflected towards the eye of a user of the solar powered ignition device so that insertion of an item to be ignited transversely through the port in the side of the main housing to the position of the reflector means results in ignition of the item.

20. A method for using a solar powered cigarette lighter, the lighter comprising:
   (a) a housing with a first end, a second end and a side wall, the housing defining a bore internal to the housing;
   (b) a lens near the first end of the housing, a focal point of the lens being in the bore within the housing;
   (c) a positioning means for assisting the positioning of an item to be ignited, the positioning means having a first end and a second end, the first end of the positioning means being located near the focal point of the lens, the positioning means being attached to the housing;
   (d) a light reflecting means on the first end of the positioning means for reflecting sunlight, and;
   (e) a port in the side wall of the housing adjacent to the first end of the positioning means,
the method comprising the steps of:
   (1) pointing the first end of the first housing towards the sun,
   (2) inserting a cigarette through the port up to the positioning means,
   (3) resting the cigarette against the positioning means until the inserted end of the cigarette ignites, and
   (4) removing the cigarette from the port.

21. A method for making a telescope, comprising the steps of:
   (a) removing a third housing from a solar powered cigarette lighter comprising
      (i) a main housing with a first end, a second end, and a side wall, the main housing defining a bore internal to the main housing;
      (ii) a lens adapted to focus the rays of the sun, the lens being positioned near the first end of the main housing, a focal point of the lens being within the bore of the main housing;
      (iii) a positioning means located within the bore of the main housing for assisting positioning of an item to be ignited, the positioning means having a first end and a second end, the first end of the positioning means being located near the focal point of the lens;
      (iv) a reflector means on the first end of the positioning means for reflecting sunlight towards an eye of a user of the solar powered ignition device;
      (v) a port in the side wall of the main housing adjacent to the first end of the positioning means through which an item to be ignited can be inserted;
      (vi) a first closure means for closing the port thereby rendering the device buoyant in water;
      (vii) a hollow second housing with a first end and a second end, the lens being fixed in position within the hollow of the second housing in a position near the first end of the second housing, the second housing having a diameter less than the diameter of the short axis of the main housing in the vicinity of the first end of the main housing so that the second end of the second housing can be reversibly inserted into the first end of the main housing;

(viii) a support means for supporting the positioning means, the support means being located in the bore of the main housing near the second end of the main housing, the support means having a cross sectional shape and diameter approximately equal to the cross sectional shape and diameter of the bore of the main housing as measured along a short axis of the main housing, the support means extending transversely across the bore of the main housing so that a circumference of the support means contacts an inner wall of the main housing in a position between the port and the second end of the main housing, and;

(ix) a third hollow housing with a first end and a second end, the third housing having a diameter less than the diameter of the short axis of the main housing in the vicinity of the second end of the main housing so that the first end of the third housing can be reversibly inserted into the second end of the main housing, the support means covering is the first end of the third hollow housing, (b) replacing the third housing with an objective lens inserted into the second end of the main housing.

* * * * *